United States Patent [19]

Hughes et al.

[11] 4,135,848
[45] Jan. 23, 1979

[54] TOOLHOLDER CLAMP FOR MACHINE TOOLS

[75] Inventors: John J. Hughes, Greendale; Theodore F. Lis, Hartland; John W. Turner, Pewaukee; Joseph P. Bliss, Greendale, all of Wis.

[73] Assignee: Kearney & Trecker Corporation, West Allis, Wis.

[21] Appl. No.: 799,304

[22] Filed: May 23, 1977

[51] Int. Cl.² .................. B23B 31/10; B23C 1/00
[52] U.S. Cl. .......................... 408/239 A; 90/11 D
[58] Field of Search .................. 408/239 A; 90/11 D

[56] References Cited

U.S. PATENT DOCUMENTS

| | | | |
|---|---|---|---|
| 3,177,775 | 4/1965 | Alisauskis | 90/11 D |
| 3,323,419 | 6/1967 | Riedel | 408/239 A |
| 3,568,566 | 3/1971 | Weidig | 408/239 A |
| 3,791,257 | 2/1974 | Frazier et al. | 90/11 D |
| 4,011,791 | 3/1977 | Lanzenberger | 408/239 A |

*Primary Examiner*—Harrison L. Hinson
*Attorney, Agent, or Firm*—Cyril M. Hajewski

[57] ABSTRACT

A pair of gripper jaws are pivotally mounted on a machine tool spindle within a central bore that opens into the toolholder socket on the outer end of the spindle. The gripper jaws have serrated outer ends that extend into the toolholder socket in position to engage a threaded opening in the inner end of a toolholder which is to be clamped in the toolholder socket. Cam surfaces on a drawbar which extends between the gripper jaws interact with cam follower surfaces on the gripper jaws to cause the gripper jaws to move radially outwardly to clamp the toolholder within the toolholder socket when the drawbar is moved axially away from the toolholder socket. The gripper jaws have axial play therein. The drawbar is spring biased axially away from the toolholder socket to clamp the toolholder in the toolholder socket and press the toolholder against the margins of the toolholder socket. A hydraulic cylinder is provided to move the drawbar axially toward the toolholder socket against the force of the spring bias to allow the outer ends of the gripper jaws to move radially inwardly to release the toolholder for removal from the spindle.

10 Claims, 6 Drawing Figures

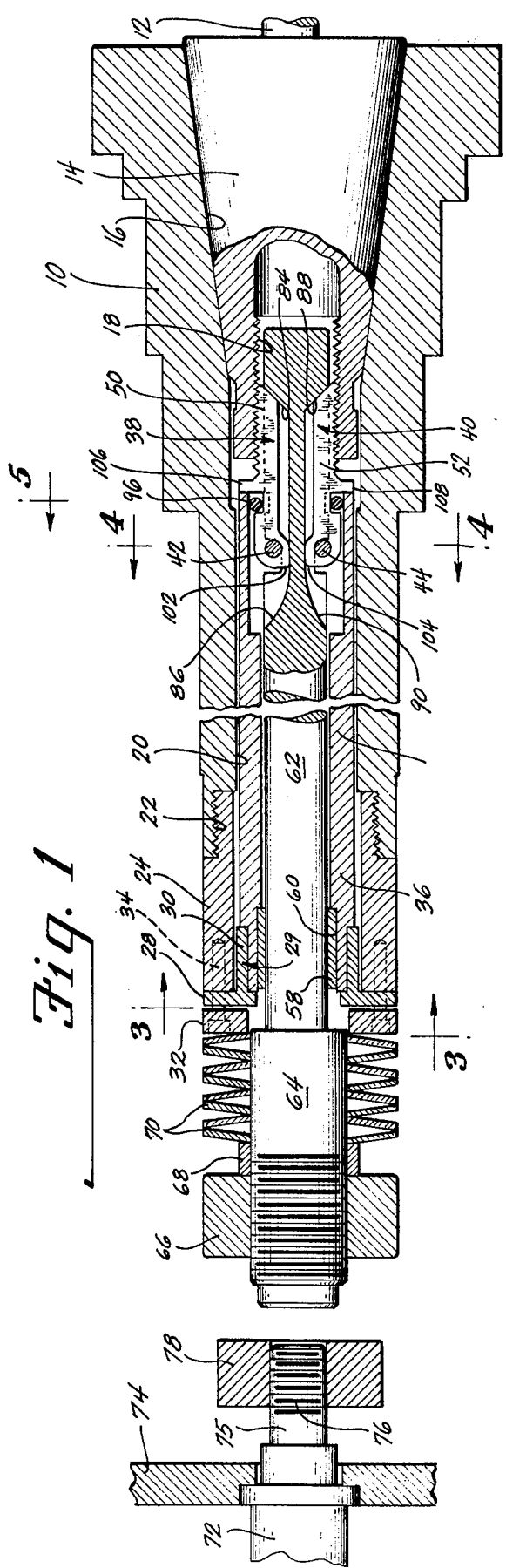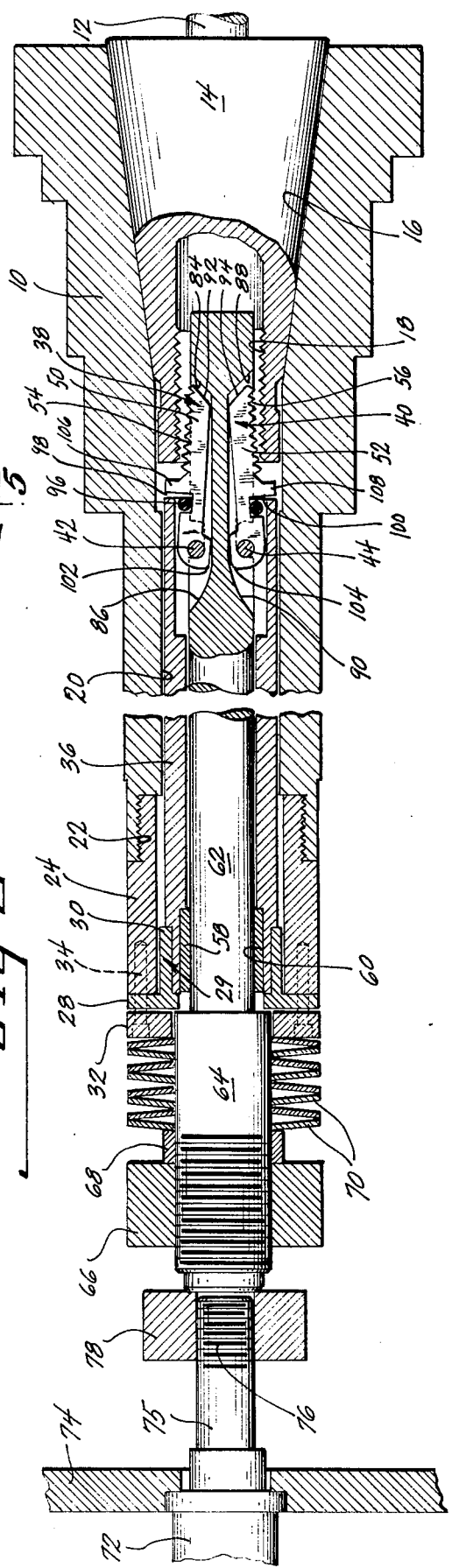

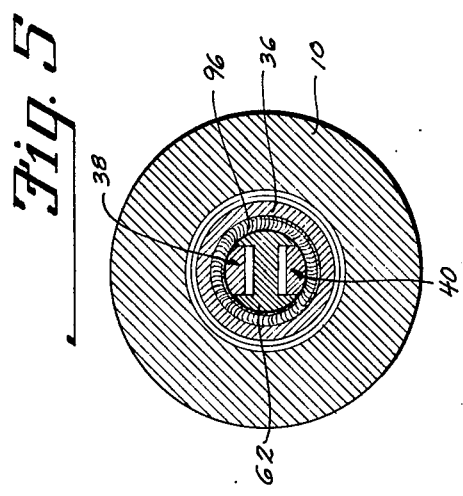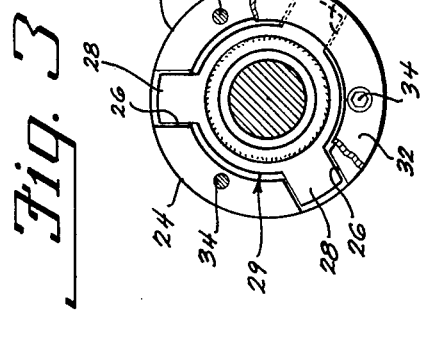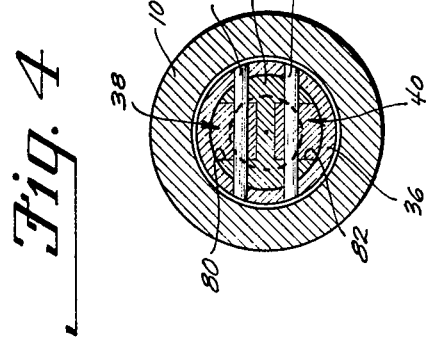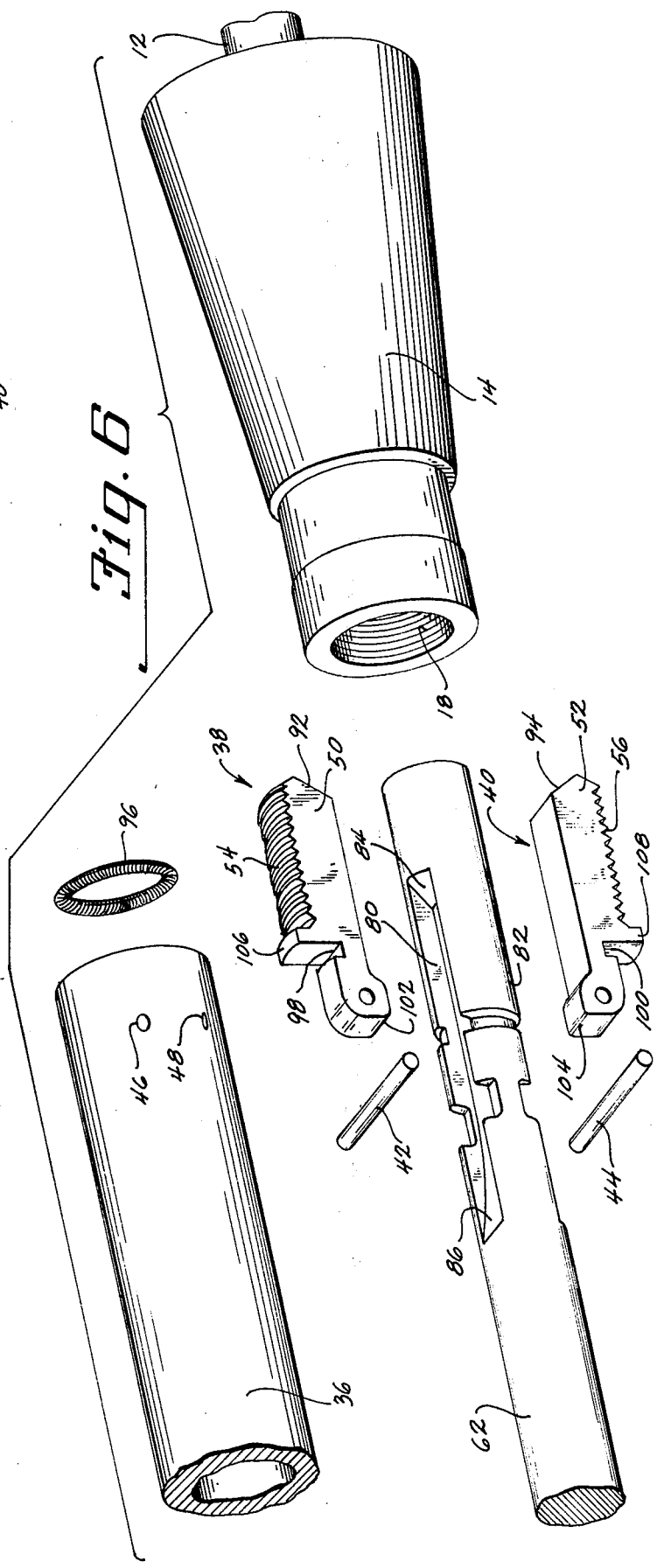

TOOLHOLDER CLAMP FOR MACHINE TOOLS

BACKGROUND OF THE INVENTION

This invention relates to toolholder clamps for clamping a toolholder in the toolholder socket on the outer end of a machine tool spindle.

One common toolholder clamp includes a drawbar which is rotatably mounted within a central longitudinal bore in the machine tool spindle and has a threaded outer end which engages a threaded opening in the inner end of the toolholder. To clamp the toolholder in the toolholder socket with this clamp, the toolholder is held in the toolholder socket and the drawbar is rotated, either manually or by a drawbar motor, to screw the end of the drawbar into the threaded opening on the end of the toolholder, thereby engaging the toolholder and drawing it against the margins of the toolholder socket and clamping it therein. To release the toolholder, the drawbar is rotated in the opposite direction to unscrew its threaded end from the toolholder.

With the above-noted type of toolholder clamp, it is difficult and time consuming to manually screw the drawbar into the toolholder, and therefore such toolholder clamps usually include a drawbar motor along with the necessary gearing and control circuits therefor.

The principal object of this invention is to provide a simplified toolholder clamp that can be quickly and easily attached to a threaded toolholder without using a drawbar motor.

Another object of the invention is to provide a simplified toolholder clamp that clamps a threaded toolholder relatively tightly in a toolholder socket but which can be quickly and easily released to remove the toolholder.

A further object of the invention is to provide a toolholder clamp for threaded toolholders which is simpler and more reliable than those heretofore known in the art.

Other objects and advantages of the invention will be apparent from the detailed description herein.

SUMMARY OF THE INVENTION

In accordance with this invention, the foregoing objects are attained by pivotally mounting at least two gripper jaws on the machine tool spindle within the drawbar bore adjacent to the toolholder socket. The gripper jaws have outer ends which extend into the toolholder socket and are serrated on their radially outer surfaces to grip a threaded opening in the inner end of a toolholder. Cam surfaces on the drawbar, which extends between the gripper jaws, interact with cam follower surfaces on the gripper jaws to cause the outer ends of the gripper jaws to move radially outwardly to clamp onto the toolholder when the drawbar is moved away from the tool socket. The drawbar is spring biased away from the toolholder socket to clamp the toolholder in the toolholder socket and press it against the margins of the toolholder socket. Means is provided for moving the drawbar toward the toolholder socket and for moving the outer ends of the gripper jaws radially inwardly in response to such movement of the drawbar to release the toolholder for removal from the spindle.

DESCRIPTION OF THE DRAWINGS

FIG. 1 is an axial sectional view of a machine tool spindle in which a preferred embodiment of this invention is mounted showing a toolholder clamped in the toolholder socket of the spindle with the various parts of the toolholder clamp in their clamped position;

FIG. 2 is an axial sectional view similar to FIG. 1 but with the various parts of the toolholder clamp shown in their unclamped position;

FIG. 3 is a cross-sectional view taken on the line 3—3 of FIG. 1;

FIG. 4 is a cross-sectional view taken on the line 4—4 of FIG. 1;

FIG. 5 is a cross-sectional view taken on the line 5—5 of FIG. 1; and

FIG. 6 is an exploded perspective view of the outer end of the drawbar and inner sleeve showing the slot in the drawbar which provides clearance for the gripper jaws along with the gripper jaws, the mounting means therefore, and a toolholder.

DESCRIPTION OF THE PREFERRED EMBODIMENTS

FIGS. 1 and 2 are axial sectional views of a horizontal machine tool spindle 10 in which a preferred embodiment of this invention is mounted. The spindle 10 is rotatably mounted in a spindle head (not shown) by conventional means and is rotated by conventional drive means (not shown) in order to rotate a tool 12 which is mounted in a toolholder 14. Toolholder 14 is clamped in a toolholder socket 16 in the outer end of spindle 10 by a preferred embodiment of the invention which is described hereinafter. Toolholder 14 has a threaded opening 18 in its inner end to receive the threaded end of a drawbar to clamp toolholder 14 in socket 16. The toolholder clamp of this invention does not use a threaded drawbar but is adapted to interact with a toolholder having a threaded opening on its inner end of the type used in combination with a threaded drawbar.

Spindle 10 has a central axial bore 20 which extends all the way through spindle 10 and opens into toolholder socket 16. The other end of bore 20 has a threaded opening 22 into which a threaded outer sleeve 24 is screwed. Sleeve 24 has three angularly spaced axial slots 26 (FIG. 3) in its outer end which receive the radially extending legs 28 of a spider 29 which has a cylindrical body 30. A collar 32 is attached to the end of sleeve 24 by machine screws 34 and serves as an outer abutment for spider legs 28, which can be moved axially, radially, and circumferentially for a limited distance determined by the clearance between collar 32 and spider legs 28, by the clearance between the cylindrical spider body 30 and the ID of sleeve 24, and by the clearance between slots 26 and spider legs 28. The reason for the axial, radial, and circumferential play in the mounting of spider 29 is described in a later paragraph.

The cylindrical spider body 30 is welded to an inner sleeve 36 which extends the full length of bore 20. A pair of gripper jaws 38 and 40 are pivotally attached to inner sleeve 36 at the end thereof adjacent to toolholder socket 16 by pivot pins 42 and 44 which extend through holes 46 and 48 respectively (FIG. 6) in the end of inner sleeve 36. Gripper jaws 38 and 40 have outer end portions 50 and 52 respectively which project into the inner end of toolholder socket 16 in position to engage the threaded opening 18 in toolholder 14 when toolholder 14 is seated in socket 16. The radially outer surfaces of end portions 50 and 52 are serrated at 54 and 56, respectively, as best shown in FIGS. 2 and 6 to engage threaded opening 18. The pitch and curvature of serrated surfaces 54 and 56 are selected to match the pitch and curvature of threaded opening 18.

Toolholder 14 is clamped in toolholder socket 16 by moving the serrated outer ends 50 and 52 of gripper jaws 38 and 40 radially outwardly to engage threaded opening 18 as shown in FIG. 1. When the serrated surfaces 54 and 56 of gripper jaws 38 and 40 first contact threaded opening 18, the threads and serrations will not normally be perfectly aligned and a slight axial movement of gripper jaws 38 and 40 will normally be required for full engagement of serrated surfaces 54 and 56 and threaded opening 18. This is one reason for the play in the mounting of spider 29 which was described earlier. The play in the mounting of spider 19 enables sleeve 36 to shift axially to permit full engagement between serrated surfaces 54 and 56 and threaded opening 18 and also to permit toolholder 14 to be pressed against the magazine of toolholder socket 16.

A bearing sleeve 58 (FIG. 1) is seated in a recess 60 in the other end of inner sleeve 36 for slidably receiving a cylindrical drawbar 62 that extends past both ends of inner sleeve 36. Drawbar 62 has an enlarged inner end 64 which is threaded to receive an adjustment nut 66. Adjustment nut 66 bears against a spacer sleeve 68 which in turn bears against one end of a stack of Belleville springs 70 the other end of which bears against collar 32. Belleville springs 70 serve to bias drawbar 62 to the left in FIG. 1 to clamp toolholder 14 in toolholder socket 16 as described in a later paragraph. Adjustment nut 66 adjusts the axial position of drawbar 62 with respect to Belleville springs 70.

A hydraulic cylinder 72 is mounted on the machine frame 74 opposite the inner end of enlarged drawbar end 64 in axial alignment therewith and has an extendable plunger 75 which is threaded at 76 to receive a nut 78 which serves as an adjustable bumper for the inner end of drawbar 62. Plunger 75 is movable between a retracted position shown in FIG. 1 and an extended position shown in FIG. 2. In its extended position, plunger 75 moves drawbar 62 axially to the right in FIG. 2 against the force of Belleville springs 70 to release toolholder 14 from toolholder socket 16 as described in a later paragraph.

Referring to FIG. 6, a pair of elongated, diametrically opposed axial slots 80 and 82 are formed in the portion of drawbar 62 that extends between gripper jaws 38 and 40. Slots 80 and 82 provide clearance for gripper jaws 38 and 40 and also have outwardly flaring ends 84, 86 and 88, 90 which constitute cam surfaces for opening and closing gripper jaws 38 and 40. Cam surfaces 84 and 86 are visible in FIGS. 1, 2 and 5 while cam surfaces 88 and 90 are only visible in FIGS. 1 and 2.

Cam surfaces 84 and 88 interact with opposing cam follower surfaces 92 and 94 (FIGS. 2 and 6) on the outermost ends of gripper jaws 38 and 40, respectively, to cause the outer ends 50 and 52 of gripper jaws 38 and 40 to move radially outwardly against threaded opening 18 when drawbar 62 is moved axially away from toolholder socket 16 (to the left in FIGS. 1, 2 and 5). This clamps the serrated surfaces 54 and 56 of gripper jaws 38 and 40 against threaded toolholder opening 18 and presses toolholder 14 against the margins of toolholder socket 16 due to the spring bias which urges drawbar 62 away from toolholder socket 16.

When drawbar 62 is moved axially toward toolholder socket 16 (to the right in FIGS. 1, 2 and 6) it breaks the contact between cam surfaces 84, 88 and cam follower surfaces 92, 94 and permits gripper jaws 38 and 40 to be moved radially inwardly to the position shown in FIG. 2 to release toolholder 14 for removal from spindle 10. Gripper jaws 38 and 40 are moved radially inwardly by the combination of a garter spring 96, which fits in slots 98 and 100 in gripper jaws 38 and 40 and biases them radially inwardly, and a pair of cam follower surfaces 102 and 104 on the inner ends of gripper jaws 38 and 40 which interact with cam surfaces 86 and 90 on drawbar 62 to cause the outer ends of gripper jaws 38 and 40 to move radially inwardly when drawbar 62 is moved toward toolholder socket 16 (to the right in FIGS. 1, 2 and 6).

Abutments 106 and 108 extend radially from gripper jaws 38 and 40 adjacent to slots 98 and 100, respectively, and abut against the outer end of sleeve 36 to limit the radially outward travel of the outer ends of gripper jaws 38 and 40 when there is no toolholder 14 in toolholder socket 16.

To clamp a toolholder 14 into toolholder socket 16, hydraulic cylinder 72 is actuated as shown in FIG. 2 to push drawbar 62 axially toward toolholder socket 16 (to the right in FIGS. 1, 2 and 6) and to allow gripper jaws 38 and 40 to move radially inwardly to the open position shown in FIG. 2. Toolholder 14 is then inserted fully into toolholder socket 16 as shown in FIG. 2. Hydraulic cylinder 72 is then returned to its unactuated position shown in FIG. 1 which permits Belleville springs 70 to move drawbar 62 axially away from toolholder socket 16, (to the left in FIGS. 1, 2 and 6) which causes the outer ends of gripper jaws 38 and 40 to move radially outwardly and to grip threaded opening 18 and also presses toolholder 14 against the margins of toolholder socket 16. This position is maintained by the pressure of Belleville springs 70 while the tool 12 is being used.

When it is desired to remove toolholder 14 from spindle 10, hydraulic cylinder 72 is actuated again to move drawbar 62 back to the released position shown in FIG. 2 and toolholder 14 is removed from spindle 10.

Although the illustrative embodiments of the invention have been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention now having been fully explained in connection with the foregoing, we hereby claim as our invention:

1. A toolholder clamp for clamping a toolholder in a toolholder socket on one end of a machine tool spindle, said toolholder having a threaded opening on its inner end, comprising:

a central axial bore in said spindle, said bore opening into said toolholder socket;

a drawbar slidably mounted within said bore;

at least two gripper jaws pivotally attached to said spindle within said bore at the end thereof adjacent to said toolholder socket, said gripper jaws having outer ends which project into said toolholder socket in position to engage said threaded opening of said toolholder, and the radially outer surfaces of said outer ends being serrated to engage said threaded opening;

a first pair of cam surfaces on said drawbar and a first pair of cam follower surfaces on said gripper jaws, each of said cam follower surfaces being in contact with a corresponding one of said cam surfaces, and said cam surfaces and cam follower surfaces being shaped to cam the outer ends of said gripper jaws radially outwardly when said drawbar is moved axially away from said toolholder socket;

said gripper jaws being positioned diametrically opposite each other and the outer end of said drawbar extending between said gripper jaws;

said first pair of cam surfaces comprising diametrically opposed outwardly flaring surfaces on the outer end of said drawbar adjacent to the outermost ends of said gripper jaws;

said first pair of cam follower surfaces being formed on the outermost ends of said gripper jaws;

means biasing said drawbar axially away from said toolholder socket to cause said gripper jaws to clamp a toolholder therein and to press said toolholder against the margins of said toolholder socket;

means for moving said drawbar axially toward said toolholder socket against the force of said biasing means; and means for moving the outer ends of said gripper jaws radially inwardly when said drawbar is moved axially toward said toolholder socket to disengage said gripper jaws from said toolholder and release it for removal from said spindle.

2. The toolholder clamp according to claim 1 wherein said means for moving the outer ends of said gripper jaws comprises:

a second pair of cam surfaces on said drawbar positioned diametrically opposite each other adjacent to the innermost ends of said gripper jaws; and a second pair of cam follower surfaces formed on the innermost ends of said gripper jaws, each of said second pair of cam follower surfaces being in contact with a corresponding one of said second pair of cam surfaces.

3. The toolholder clamp according to claim 2 and also comprising:

second bias means biasing the outer ends of said gripper jaws radially inwardly.

4. The toolholder clamp according to claim 3 wherein said second bias means comprises:

a garter spring engaging the outer ends of both of said gripper jaws.

5. The toolholder clamp according to claim 2 and also comprising:

a pair of diametrically opposed slots in the outer end of said drawbar extending between said first and second pair of cam surfaces, said gripper jaws extending into said slots.

6. The toolholder clamp according to claim 5 wherein said first pair of cam surfaces comprises:

a pair of radially outwardly flared outer ends of said slots and wherein said second pair of cam surfaces comprises:

a pair of radially outwardly flared inner ends of said slots.

7. A toolholder clamp for clamping a toolholder in a tool holder socket on one end of a machine tool spindle, said toolholder having a threaded opening on its inner end, comprising:

a central axial bore in said spindle, said bore opening into said toolholder socket;

a drawbar slidably mounted within said bore;

at least two gripper jaws pivotally attached to said spindle within said bore at the end thereof adjacent to said toolholder socket, said gripper jaws having outer ends which project into said toolholder socket in position to engage said threaded opening of said toolholder, and the radially outer surfaces of said outer ends being serrated to engage said threaded opening;

a first pair of cam surfaces on said drawbar and a first pair of cam follower surfaces on said gripper jaws, each of said cam follower surfaces being in contact with a corresponding one of said cam surfaces, and said cam surfaces and cam follower surfaces being shaped to cam the outer ends of said gripper jaws radially outwardly to grip said toolholder when said drawbar is moved axially away from said toolholder socket;

means biasing said drawbar axially away from said toolholder socket to cause said gripper jaws to clamp a toolholder therein and to press said toolholder against the margins of said toolholder socket;

means for moving said drawbar axially toward said toolholder socket against the force of said biasing means;

a second pair of cam surfaces on said drawbar for camming the outer ends of said gripper jaws radially inwardly when said drawbar is moved axially toward said toolholder socket; and a second pair of cam follower surfaces on said gripper jaws each in contact with a corresponding one of said second pair of cam surfaces.

8. A toolholder clamp for clamping a toolholder in a toolholder socket on one end of a machine tool spindle, said toolholder having a threaded opening on its inner end, comprising:

a central axial bore in said spindle, said bore opening into said toolholder socket;

a sleeve within said bore;

at least two gripper jaws pivotally attached to said sleeve at the end thereof adjacent to said toolholder socket, said gripper jaws having outer ends which project into said toolholder socket in position to engage said threaded opening of said toolholder, and the radially outer surfaces of said outer ends being serrated to engage said threaded opening;

a drawbar slidably mounted within said sleeve;

means for moving the outer ends of said gripper jaws radially outwardly to grip said toolholder when said drawbar is moved axially away from said toolholder socket;

means biasing said drawbar axially away from said toolholder socket to cause said gripper jaws to clamp a toolholder therein and to press said toolholder against the margins of said toolholder socket;

means for moving said drawbar axially toward said toolholder socket against the force of said biasing means; and means for moving the outer ends of said gripper jaws radially inwardly when said drawbar is moved axially toward said toolholder socket to disengage said gripper jaws from said toolholder and release it for removal from said spindle.

9. The toolholder clamp according to claim 8 wherein said outer ends of said gripper jaws extend past the adjacent end of said sleeve and wherein said adjacent end of said sleeve is close enough to said toolholder socket to permit said outer ends of said gripper jaws to extend therein.

10. A toolholder clamp according to claim 8 wherein said sleeve is loosely attached to said spindle to permit enough axial play in said drawbar to fully engage said serrated gripper jaws with said threaded opening and to press said toolholder against the margins of said toolholder sockets.

* * * * *